United States Patent

Bobeck

[15] 3,676,870

[45] July 11, 1972

[54] SINGLE WALL DOMAIN TRANSFER CIRCUIT

[72] Inventor: Andrew Henry Bobeck, Chatham, N.J.

[73] Assignee: Bell Telephone Laboratories, Incorporated, Murray Hill, Berkeley Heights, N.J.

[22] Filed: May 13, 1971

[21] Appl. No.: 142,900

[52] U.S. Cl. ....................340/174 TF
[51] Int. Cl. ....................G11c 11/14
[58] Field of Search ....................340/174 TF

[56] References Cited

UNITED STATES PATENTS 3,618,054 2/1972 Bonyhard et al. ....................340/174 TF

*Primary Examiner*—Bernard Konick
*Assistant Examiner*—Gary M. Hoffman
*Attorney*—R. J. Guenther and Kenneth B. Hamlin

[57] ABSTRACT

Single wall domains are moved in a layer of a host magnetic material in response to magnetic poles generated in channel defining elements in response to a magnetic field reorienting in the plane of the layer in what is called a "field access" mode of operation. Domains are transferred herein between channels, so defined, by the in-plane field when the originating and receiving positions for a domain at each transfer location are encompassed by a conductor loop which, when pulsed, defines a magnetic fence about the positions.

9 Claims, 5 Drawing Figures

Patented July 11, 1972 3,676,870

2 Sheets-Sheet 1

INVENTOR
A. H. BOBECK
BY Herbert M. Shapiro
ATTORNEY

SINGLE WALL DOMAIN TRANSFER CIRCUIT

FIELD OF THE INVENTION

This invention relates to data processing arrangements and more particularly to such arrangements in which information is represented as single wall domains.

BACKGROUND OF THE INVENTION

The term "single wall domain" to a magnetic domain which is movable in a layer of a suitable magnetic material and is encompassed by a single domain wall which closes on itself in the plane of the layer.

Propagation arrangements for moving a domain are designed to produce magnetic fields of a geometry determined by the layer in which a domain is moved. Most materials in which single wall domains are moved are characterized by a preferred magnetization direction, for all practical purposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attracting magnetic field normal to the layer and at a localized position offset from the position occupied by the domain. A succession of such fields causes successive movement of a domain as is well known.

One propagation arrangement comprises a pattern of electrical conductors each designed to form conductor loops which generate the requisite fields when externally pulsed. The loops are interconnected and pulsed in a three-phase manner to produce shift register operation.

An alternative propagation arrangement employs a pattern of magnetically soft elements adjacent the surface of a layer in which single wall domains are moved (or a pattern of grooves in the surface). In response to a magnet field reorienting in the plane of the layer, changing pole patterns are generated in the elements. The elements are arranged to displace domains along a selected path in the layer as the in-plane field reorients. The familiar T- (or Y-) bar overlay arrangements respond to a rotating in-plane field to so displace domains. Arrangements of this type are called "field access" arrangements.

Copending application Ser. No. 875,338 filed Nov. 10, 1969, for P. I. Bonyhard, U. F. Gianola, and A. J. Perneski, now U.S. Pat. No. 3,618,054 discloses a mass memory organization which employs a field access mode of operation. Magnetic elements juxtaposed with the surface of a material in which single wall domains can be moved define a plurality of propagation channels in each of which information is recirculated as an in-plane field reorients. The pattern of elements is organized such that a single channel (a "major loop") is arranged along one dimension of the layer and the remaining channels (minor loops) are arranged along the other dimension in parallel with one another. Each of the parallel channels comes into close proximity with an associated position in the vertical channel defining a "transfer position" there. Operation of the memory requires the transfer of domain patterns from the parallel channels to the vertical channel, where read and write operations occur, and back again.

Domain transfer between major and minor loops has been accomplished by a modified geometry of the channel defining elements to respond to reversals in the in-plane field reorientations. But arrangements of this type require increased expense in the drive circuitry for producing the requisite reversals. Transfer also has been accomplished by depositing a magnetically retentive element on top of a channel defining element. The retentive element can be set magnetically by pulsing a conductor thus denying an otherwise preferred position to a recirculating domain and forcing the domain to an alternate (transfer) position. But this type of arrangement requires additional processing steps to form the retentive element. Certainly, it is advantageous to employ the reorienting in-plane field itself to transfer domains. The problem is to provide an implementation which ensures that a domain moves to the desired receiving position and can later be returned to its original position.

BRIEF DESCRIPTION OF THE INVENTION

A pair of closely spaced parallel electrical conductors aligned between the parallel channels, on the one hand, and the single vertical channel, on the other, of the above-mentioned field access mass memory separate further locally at each position at which the parallel channels come into close proximity with the vertical channel. At each location at which the separation increases, the conductors encompass a pair of positions between which a domain (or absent domain) is transferred. The conductors are pulsed to generate an attracting magnetic field for domains within the areas encompassed by the conductors (the transfer positions) for a time to permit the in-plane field to reorient. The pattern of elements which defines the channels is modified at each transfer position to generate a pole pattern to move a domain away from its present position. The conductor field excludes all but one receiving position for a domain so moved.

DETAILED DESCRIPTION

Figure 1:
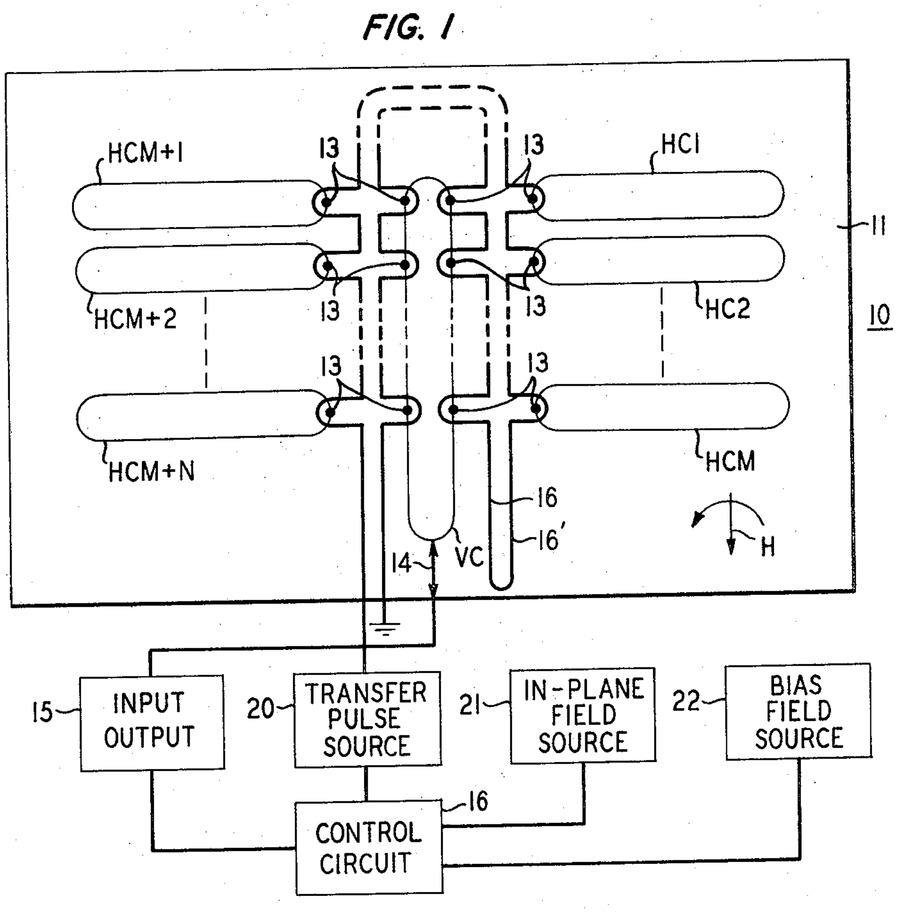
FIG. 1 is a schematic illustration of a mass memory organization employing a transfer circuit in accordance with this invention.

FIG. 1 shows a domain mass memory organization 10 including a transfer circuit in accordance with this invention. The arrangement comprises a layer 11 of material in which single wall domains can be moved.

Figure 2:
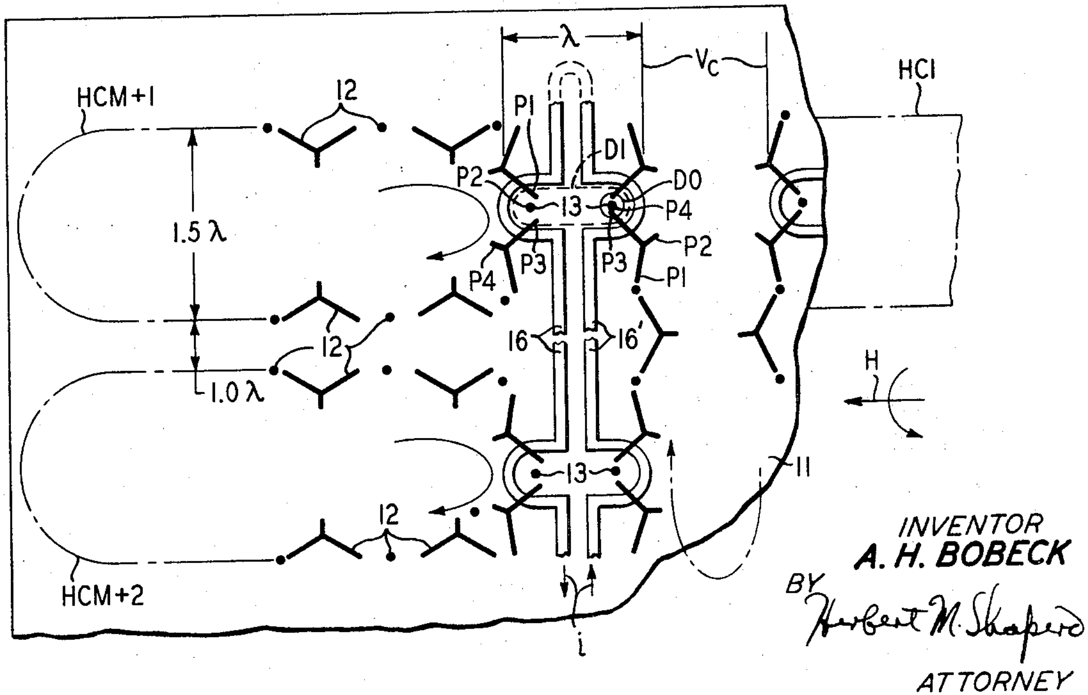
FIGS. 2 through 5 are schematic illustrations of portions of the arrangement of FIG. 1.

A pattern of magnetically soft overlay elements 12, as shown in FIG. 2, is juxtaposed with the surface of layer 11 for defining a single vertical domain recirculating channel and a plurality of horizontal channels represented by closed loop VC and closed loops HCl through HCM+N, respectively, in FIG. 1. The horizontal channels are shown organized into groups to the right and left of vertical channel VC in a now-familiar fashion.

Operation of the arrangement of FIG. 1 includes the simultaneous transfer of a bit of information (the presence and absence of a domain) between each transfer position 13 in the horizontal channels and the associated position 13 in the vertical channel as shown in FIG. 1. Input and output circuits represented by double headed arrow 14 in FIG. 1 are operative to alter or detect information so transferred from and returned to horizontal channels by the transfer arrangement. Such input-output circuitry is well known and merely represented herein by block 15 in FIG. 1 without further discussion. The circuitry in operated under the control of control circuit 16.

We will direct our attention primarily to the arrangement for transferring information in the context of the aforedescribed "major-minor" organization.

FIGS. 2 through 5 show a magnetically soft overlay pattern for a portion of horizontal channels HCl, HCM+1, and HCM+2 of FIG. 1 and vertical channel VC where the channels are closely spaced for defining transfer positions. The pattern is referred to as a "Y-dot" pattern which is a modification of and operates like the Y-bar pattern mentioned above. The positions 13 of FIG. 1 can be seen to correspond to dots of the Y-dot pattern in FIG. 2, positions normally occupied by information (viz. a domain) during each cycle of the in-plane field. The in-plane field is assumed to be reorienting continuously by rotating counter clockwise as indicated by the curved arrow through arrows H in the figures.

The Y-dot overlay geometry is designed to move domains in a clockwise direction in the various channels as indicated by the clockwise-directed curved arrows in FIG. 2 in response to a counter clockwise rotating in-plane field. It is convenient to designate the consecutive positions of a domain in terms of the in-plane field orientation. Accordingly, when the in-plane field is directed downward as represented by the arrow H in FIG. 1, the field is said to be in a first-phase orientation and a domain occupies position P1 in FIG. 2. The in-plane field is assumed to be oriented first to the right, then upward, and then to the left before returning to its downward starting orientation for initiating a next cycle of rotation. Domains, in response, move through the sequence of positions P2, P3, and P4 as shown in FIG. 2.

It is helpful to recognize that the left and right positions 13 associated with channel HCM+1, as viewed in FIG. 2, correspond to positions P2 and P4, respectively. That is to say, a domain occupies the position 13 to the right during a fourth phase of the in-plane field and a domain occupies the position 13 to the left during a second phase of the in-plane field. The transfer operation will be seen to occur during two phases of the in-plane field, initiated at the onset of the second or fourth phases depending on whether transfer is from left to right or right to left as viewed in FIG. 2. A two-phase transfer operation may be recognized to result in domain transfer to a position consistent with the movement of the remaining information in the memory.

Conductors 16 and 16′ are shown closely spaced and disposed to occupy the separation between the horizontal channels and the vertical channel. The geometry of the conductors is such that the separation therebetween increases in the neighborhood of each pair of positions 13 to encompass the dots at positions 13 as well as portions of the associated Y elements.

Transfer occurs when a domain (or absent domain) occupies a representative position 13 in the vertical loop and transfer to the associated position 13 of a horizontal loop, or vice versa, is desired. In either case, the transfer operation is initiated by a pulse applied to conductors 16 and 16′ (they may comprise a single conductor by transfer pulse source 20 of FIG. 1 under the control of control circuit 16.

The source of the in-plane field is represented by block 21 of FIG. 1.

FIG. 2 shows arrow H directed in an assumed initial direction to the left, as viewed, resulting in domain DO moving to a fourth phase position P4 which coincides with a position 13 as shown. A current, represented by arrows *i* in FIG. 2, is applied to conductors 16 and 16′ at this juncture to generate in the transfer position a magnetic field of a polarity to reduce locally the magnitude of the uniform bias field which maintains the domain size constant in layer 11. A source of such a uniform bias field is represented by block 22 of FIG. 1. The resulting local reduction in bias field causes domain DO to expand into the area encompassed by the more widely separated portions of conductors 16 and 16′ (at the transfer positions) as represented by the broken curve D1 in FIG. 2.

The arrows *i* in FIG. 2 are in a proper direction for Y-dot patterns in a plane between the plane of layer 11 and the plane of conductors 16 and 16′.

Figure 3:
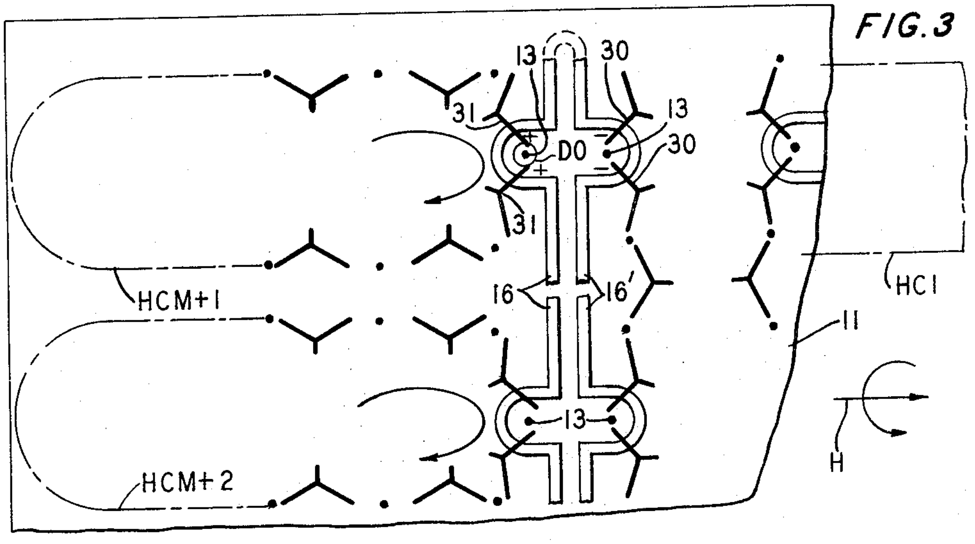

The in-plane field at this juncture reorients downward and then to the right as shown by the arrow H in FIG. 3. The field in this latter orientation causes repelling poles to accumulate in portions of Y-shaped elements 30 of FIG. 3 within the transfer position and attracting poles to accumulate in portions of Y-shaped elements 31 within the transfer position as indicated by the plus and minus signs in the figure. The current in conductors 16 and 16′ is terminated at this time and the domain DO returns to its normal operating size at its destination as shown in FIG. 3. Transfer from the vertical loop to the horizontal loop has now been illustrated and can be seen to occur in response to a current pulse in a transfer conductor as the in-plane field reorients through 180° of a cycle of the in-plane field.

Figure 4:
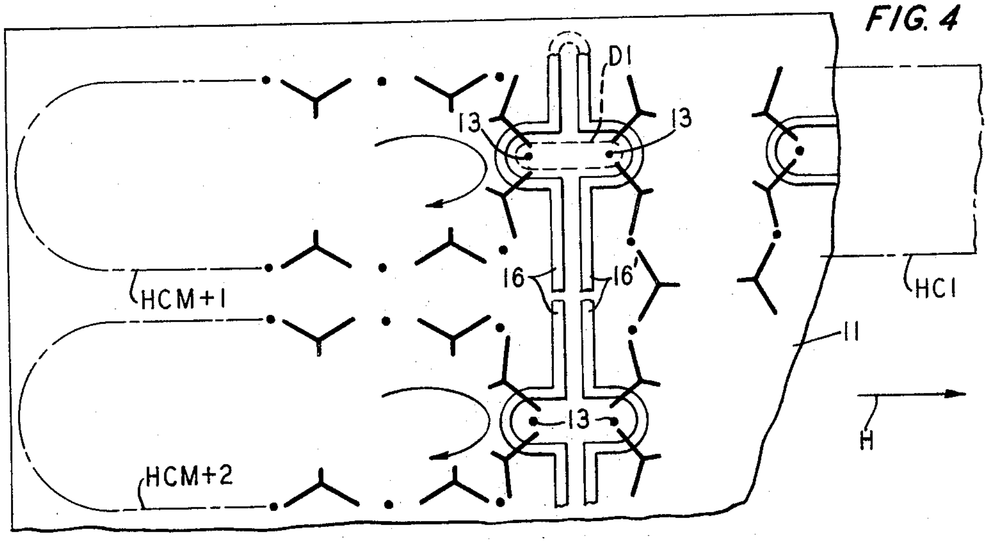
Figure 5:
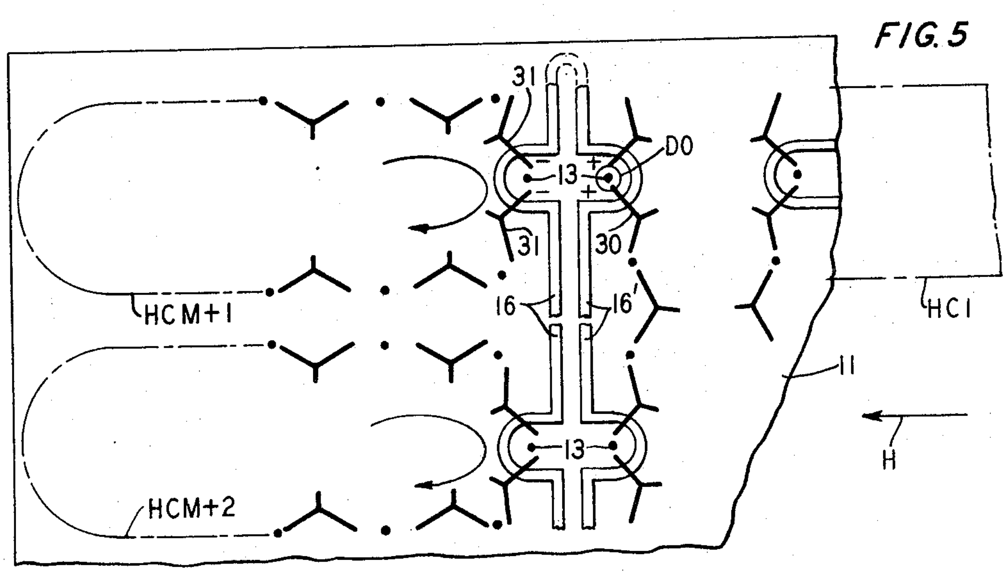

The transfer of information in the opposite direction is initiated when the in-plane field is oriented to the right as indicated by arrow H in FIG. 4. Once again, a current is applied to conductors 16 and 16′ to initiate a transfer operation. The bias reduces locally thus enlarging domain DO to a size again indicated by broken curve D1 in FIG. 4. The current in conductors 16 and 16′ is terminated when the in-plane field is next oriented to the left as indicated by arrow H in FIG. 5. In response, domain DO contracts to its normal size returning to its original position of FIG. 2 by the repelling and contracting poles generated in elements 31 and 30 respectively by the in-plane field.

It has now been shown that the transfer circuit in accordance with this invention is operative to transfer a domain in one channel to another position in a second channel and back again. But it should be clear from a glance at FIG. 1 that transfer occurs simultaneously at all transfer positions coupled by conductors 16 and 16′ where those conductors are separated relatively widely as described. Moreover, it may be appreciated that the absence of a domain at any position results in the transfer of that absence of a domain.

The transfer operation has been described in terms of the current in the transfer conductors generating a field which locally reduces the bias field for causing domain expansion. The degree of expansion exhibited by a domain so transferred, of course, depends on the magnitude of the transfer pulse. The pulse may be sufficiently large to cause domain strip out in which case the domain wall will be virtually under the loop defined by the conductors. On the other hand, the pulse may be relatively small to cause a small enlargement of the domain transferred but sufficiently large to define a magnetic fence about the positions 13. In this instance as well as where domain strip out occurs, a magnetic fence of this type functions to exclude all possible domain positions, except the alternative position 13, from receiving a domain initially occupying an associated position 13 when a transfer operation occurs.

It is to be understood that the Y-dot magnetically soft overlay pattern is just illustrative of a variety of patterns useful in concert with a transfer circuit in accordance with this invention. T-bar, Y-bar, grooves, and a variety of other overlay geometries, depending on the sequence of orientations for the in-plane field, are entirely compatible. Further, a variety of element patterns are useful within the transfer area. All that is necessary is that the elements be responsive to the reorienting inplane field to move a domain in the direction of its destination and provide an attracting pole at the destination. The transfer conductor geometry functions to establish a magnetic fence to limit the destination options for a domain in the transfer area.

A transfer loop of the type shown in FIG. 2 has been operated to move a 4-micron domain in an epitaxial layer of Europium Erbium garnet, 5 microns thick grown on a substrate of Gadolinium Gallium garnet by liquid phase epitaxial techniques. A Y-dot pattern of permalloy 3,000 Angstrom units thick having a coercive force of 0.5 oersted and a period (λ) of 20 microns was employed in the arrangement shown. Transfer currents of 40 milliamperes were employed for domain transfer at a 100 kilocycle rate in the manner described. A bias field of 70 oersteds was employed along with an in-plane field of 30 oersteds. A transfer conductor 2 microns × 0.3 micron of gold was driven with a 30 milliampere pulse of 1 μsec. duration to expand a domain for transfer. The parallel transfer loop sections were spaced apart 2 microns separated to 30 microns at the transfer positions.

What has been described is considered merely illustrative of the principles of this invention. Therefore, various modifications can be devised by those skilled in the art in accordance with this invention within the spirit and scope of this invention.

What is claimed is:

1. A single wall domain transfer circuit comprising a layer of material in which single wall domains can be moved, a pattern of elements for defining in said material first and second propagation channels for said domains including first and second positions, respectively, for moving said domains in response to a magnetic field reorienting in the plane of said layer, an electrical conductor arrangement encompassing said first and second positions and providing thereabout a magnetic field for limiting the area of domain movement to said first and second positions when pulsed, said pattern including at least one element also encompassed by said conductor arrangement and responsive to said reorienting field for generating magnetic poles for moving domains from one to the other of said first and second positions.

2. A circuit in accordance with claim 1 wherein said pattern of elements comprises magnetically soft material juxtaposed with the surface of said layer.

3. A circuit in accordance with claim 2 wherein said first and second positions are defined by said overlay elements for occupation by a domain for first or second orientations of said in-plane field respectively, and means for pulsing said conductor arrangement for a time for said reorienting field to reorient from said first to said second or from said second to said first orientations.

4. '. circuit in accordance with claim 3 wherein said conductor arrangement comprises a pair of closely spaced conductors of a geometry to separate further locally to encompass said first and second positions.

5. A circuit in accordance with claim 2 wherein said pattern of elements is of a geometry to define a plurality of said first channels oriented along a first dimension of said layer and a single second channel oriented along a second dimension, each of said plurality of channels being closely spaced from said second channel for defining a plurality of said first and second positions in pairs, said electrical conductor arrangement encompassing said pairs of positions being connected electrically in series.

6. A circuit in accordance with claim 5 also including means for providing a bias field for maintaining said domains at a prescribed diameter.

7. A circuit in accordance with claim 6 wherein said electrical conductor arrangement when pulsed locally expands domains at said first and second positions.

8. A circuit in accordance with claim 7 wherein said electrical conductor arrangement when pulsed expands a domain at each of said first and second positions to encompass the associated second or first position in each instance.

9. A circuit in accordance with claim 8 including means for terminating said pulse when said reorienting field next reorients to said first or second orientation.

* * * * *